United States Patent
Syeda-Mahmood et al.

(10) Patent No.: US 7,542,954 B1
(45) Date of Patent: *Jun. 2, 2009

(54) DATA CLASSIFICATION BY KERNEL DENSITY SHAPE INTERPOLATION OF CLUSTERS

(75) Inventors: Tanveer Syeda-Mahmood, Cupertino, CA (US); Peter J. Haas, San Jose, CA (US); John M. Lake, Cary, NC (US); Guy M. Lohman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/164,532

(22) Filed: Jun. 30, 2008

Related U.S. Application Data

(63) Continuation of application No. 12/142,949, filed on Jun. 20, 2008, which is a continuation of application No. 11/940,739, filed on Nov. 15, 2007, now Pat. No. 7,412,429.

(51) Int. Cl.
G06F 17/00 (2006.01)
G06F 15/00 (2006.01)
G06F 15/18 (2006.01)
G06N 5/00 (2006.01)

(52) U.S. Cl. .......................... 706/45; 706/62

(58) Field of Classification Search .......... 706/45, 706/62
See application file for complete search history.

(56) References Cited

U.S. PATENT DOCUMENTS

| 5,671,294 A | 9/1997 | Rogers et al. |
|---|---|---|
| 2003/0147558 A1 | 8/2003 | Loui et al. |
| 2006/0217925 A1 | 9/2006 | Taron et al. |
| 2007/0003137 A1 | 1/2007 | Cremers et al. |

*Primary Examiner*—David R Vincent
*Assistant Examiner*—Benjamin Buss
(74) *Attorney, Agent, or Firm*—Cantor Colburn LLP; Van Nguy

(57) ABSTRACT

A method for representing a dataset comprises clustering the dataset using an unsupervised, non-parametric clustering method to generate a set of clusters each comprising a set of data points in an image; clustering the data points of each cluster using a supervised, partitional clustering method to partition each cluster into a specified number of sub-clusters; generating a density estimate value of each grid point of a set of grid points sampled from the image at a specified resolution for each sub-cluster using a kernel density function; identifying a maximum density estimate value and a sub-cluster associated with the maximum density estimate value for the grid point; adding each grid point for which the maximum density estimate value exceeds a specified threshold to the sub-cluster associated with the maximum density estimate value; and, for each cluster, merging the sub-clusters of the cluster into a corresponding cluster region in the image.

5 Claims, 4 Drawing Sheets

US 7,542,954 B1

DATA CLASSIFICATION BY KERNEL DENSITY SHAPE INTERPOLATION OF CLUSTERS

CROSS-REFERENCE TO RELATED APPLICATIONS

This application is a continuation of U.S. patent application Ser. No. 12/142,949, filed Jun. 20, 2008, which is a continuation of U.S. patent application Ser. No. 11/940,739, filed Nov. 15, 2007. The disclosures of the above applications are incorporated herein by reference.

BACKGROUND

Exemplary embodiments of the present invention relate to data classification, and more particularly, to shape interpolation of clustered data.

Data mining involves sorting through large amounts of data and extracting relevant predictive information. Traditionally used by business intelligence organizations and financial analysts, data mining is increasingly being used in the sciences to extract information from the enormous datasets that are generated by modern experimental and observational methods. Data mining can be used to identify trends within data that go beyond simple analysis through the use of sophisticated algorithms.

Many data mining applications depend on the partitioning data elements into related subsets. Therefore, classification and clustering are important tasks in data mining. Clustering is the unsupervised categorization of objects into different groups, or more precisely, the organizing of a collection of patterns (usually represented as a vector of measurements, or a point in a multidimensional space) into clusters based on similarity. A cluster is a collection of objects that are "similar" between them and "dissimilar" to the objects belonging to other clusters. The goal of clustering is to determine an intrinsic grouping, or structure, in a set of unlabeled data. Clustering can be used to perform statistical data analysis in many fields, including machine learning, data mining, document retrieval, pattern recognition, medical imaging and other image analysis, and bioinformatics.

Classification is a statistical procedure in which individual items are placed into groups based on quantitative information on one or more traits inherent in the items and based on a training set of previously labeled (or pre-classified) patterns. As with clustering, a dataset is divided into groups based upon proximity such that the members of each group are as "close" as possible to one another, and different groups are as "far" as possible from one another, where distance is measured with respect to specific trait(s) that are being analyzed.

An important difference should be noted when comparing clustering and classification. In classification, a collection of labeled patterns is provided, and the problem is to label a newly encountered, yet unlabeled, pattern. Typically, the given training patterns are used to learn the descriptions of classes, which in turn are used to label a new pattern. In the case of clustering, the problem is to group a given collection of unlabeled patterns into meaningful clusters. In a sense, clusters can be seen as labeled patterns that are obtained solely from the data. Therefore, classification often succeeds clustering, although classification may also be performed without explicit clustering (for example, Support Vector Machine classification, described below). In situations in which classification is performed once the clusters have been identified, new data is typically classified by projecting the data into the multidimensional space of clusters and classifying the new data point based on proximity, that is, distance, to the nearest cluster centroid. The centroid of cluster having a finite set of points can be computed as the arithmetic mean of each coordinate of the points.

The variety of techniques for representing data, measuring proximity between data elements, and grouping data elements has produced a rich assortment of classification and clustering methods.

In Support Vector Machine classification (SVM), when classifying a new data point based on proximity, the distance is taken to the nearest data points coming from the clusters (even though there is no explicit representation of the cluster) called support vectors. Each new data point is represented by a p-dimensional input vector (a list of p numbers) that is mapped to a higher dimensional space where a maximal separating hyperplane is constructed. Each of these data points belongs to only one of two classes. Two parallel hyperplanes are constructed on each side of the hyperplane that separates the data. SVM aims to separate the classes with a "p minus 1"-dimensional hyperplane. To achieve maximum separation between the two classes, a separating hyperplane is selected that maximizes the distance between the two parallel hyperplanes. That is, the nearest distance between a point in one separated hyperplane and a point in the other separated hyperplane is maximized.

In fuzzy clustering, data elements can belong to more than one cluster, and cluster membership is based on proximity test to each cluster. Associated with each element is a set of membership levels that indicate the strength of the association between that data element and the particular clusters of which it is a member. The process of fuzzy clustering involves assigning these membership levels and then using them to assign data elements to one or more clusters. Thus, points on the edge of a cluster may be in the cluster to a lesser degree than points in the center of cluster.

In categorical classification methods based on decision tree variants, the classification is based on the likelihood of the data point coming from any of the clusters based on the sharing of attribute values. Using a decision tree model, observations about an item are mapped to conclusions about its target cluster. In these tree structures, leaves represent classifications and branches represent conjunctions of features that lead to those classifications.

Classification using proximity to either centroids of clusters or support vectors is generally inadequate to properly classify data points. To provide for more accurate classification, the shape of the cluster should be taken into account. FIG. 1, illustrating an exemplary clustering of a dataset, demonstrates this problem. The points along the direction of the cluster indicated by W should be more likely to be classified as belonging to this cluster than the set of points indicated by X that are the same distance from the centroid as the points indicated by W. Points lateral to the cluster should be less likely to belong to the cluster than the points at the top edge, even when they have the same proximity to the centroid or support vectors of this cluster.

SUMMARY

The shortcomings of the prior art can be overcome and additional advantages can be provided through exemplary embodiments of the present invention that are related to a method executed on a computer for representing a dataset for data classification. The method comprises clustering the dataset using an unsupervised, non-parametric clustering method to generate a set of clusters each comprising a set of data points in an image of the dataset; clustering the data points of each cluster of the set of clusters using a supervised, partitional clustering method to partition each cluster into a specified number of sub-clusters each comprising a subset of the set of data points of the cluster; generating a density estimate value of each grid point of a set of grid points sampled from the image at a specified resolution for each sub-cluster in the image using a kernel density function; evaluating the density estimate value of each grid point for each sub-cluster to identify a maximum density estimate value for the grid point and a sub-cluster associated with the maximum density estimate value for the grid point; adding each grid point for which the maximum density estimate value exceeds a specified threshold to the sub-cluster associated with the maximum density estimate value for the grid point; and, for each cluster of the set of the clusters, merging the sub-clusters of the cluster into a cluster region in the image corresponding to the cluster to form a shape interpolated representation of the set of clusters.

The shortcomings of the prior art can also be overcome and additional advantages can also be provided through exemplary embodiments of the present invention that are related to computer program products and methods corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
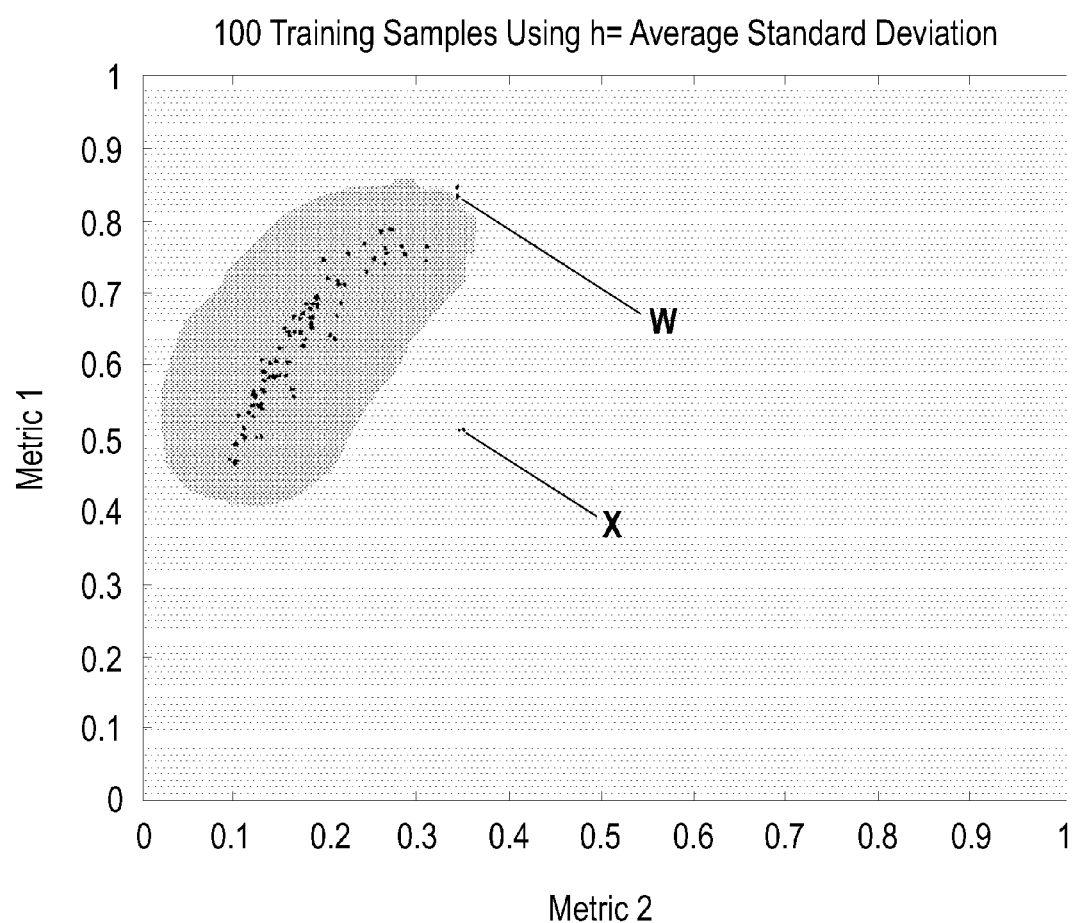
FIG. 1 is a graph illustrating an exemplary clustering of a dataset.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention described herein can be implemented to perform data classification using shape interpolation of clusters. Shape interpolation is the process of transforming one object continuously into another. Modeling of cluster shapes has thus far been limited to representations either as a collection of isolated points within the same cluster label or through global parametric models such as mixtures of Gaussians. Cluster structure, however, cannot adequately be described as collection of isolated points, and the parametric models typically operate to smooth the arbitrary distributions that characterize clusters by approximately fitting the distributions to a geometric shape having predetermined boundaries and therefore also cannot accurately represent the perceptible regions of the shape of a cluster. All parametric densities are unimodal, that is, they have a single local maximum, while many practical problems involve multimodal densities. Furthermore, traditional surface interpolation methods used in computer vision are not applicable to considerations of higher-dimensional point distributions.

Exemplary embodiments described herein can be implemented to interpolate cluster shapes in a manner that is able to preserve the overall perception of the shapes given by the data points in a multidimensional feature space. In exemplary embodiments of the present invention, to generate a continuous manifold characterizing a cluster, the given sample points already present in the cluster are treated as anchor points and a probability density function, which is a function that represents a probability distribution in terms of integrals, is hypothesized from observed data. More specifically, exemplary embodiments can be implemented to represent cluster shapes using a model that is based on density estimation. Density estimation involves the construction of an estimate, based on observed data, of an unobservable underlying probability density function. The unobservable density function is viewed as the density according to which a large population is distributed, and the data are usually thought of as a random sample from that population.

Because of the sparseness of multidimensional datasets in comparison to feature space dimensions, it can be useful for exemplary embodiments to first obtain a clustering of the dataset that provides dense representation of the shapes of the clusters in which the clusters are viewed as regions of the pattern space in which the patterns are dense, separated by regions of low pattern density. Clusters can then be identified by searching for regions of high density, called modes, in the pattern space. The close fit provided by a dense representation of the cluster shapes would help in later classification of new data points, as the classification would be based on membership within multidimensional manifolds rather than distance alone.

Even more specifically, exemplary embodiments as described herein utilize kernel density estimation, which is a method of estimating the probability density function of a random variable. Kernel density estimation is a nonparametric technique for density estimation in which a known density function, the kernel, is averaged across the observed data points to create a smooth approximation. Nonparametric procedures can be used with arbitrary distributions and without the assumption that the forms of the underlying densities are known. Although it is possible for less smooth density estimators such as the histogram density estimator to be made to be asymptotically consistent, other density estimators are often either discontinuous or converge at slower rates than the kernel density estimator. Rather than grouping observations together in bins, the kernel density estimator can be thought of as placing small "bumps" at each observation determined by the kernel function. As a result, the estimator consists of a "sum of bumps" and creates a smoother, finer approximation or the regions of cluster shapes that does not depend on end points or bounded, pre-determined shapes.

Figure 2:
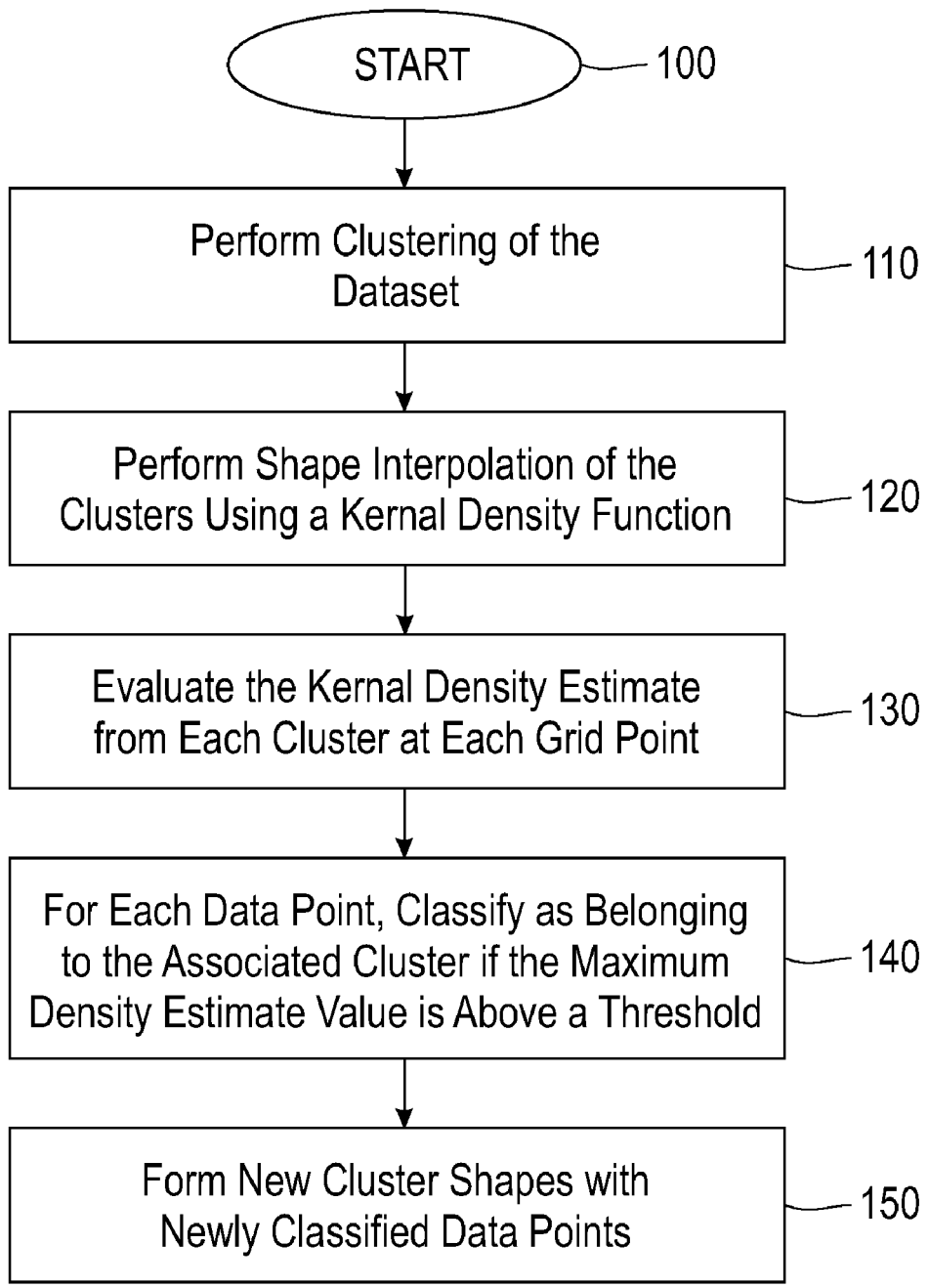
FIG. 2 is a flow diagram illustrating an exemplary embodiment of a shape interpolation process in accordance with the present invention.

FIG. 2 illustrates a flow diagram of a process, indicated generally at 100, for performing shape interpolation of clusters using a kernel density function in accordance with an exemplary embodiment of the present invention. Because the kernel density interpolation will be applied for purposes of representing cluster shapes, the initial clustering of a dataset first performed at block 110 using any clustering method, including, for example, any suitable partitional (e.g., k-means, k-mediod, nearest neighbor), overlapping (e.g., fuzzy c-means), hierarchical (e.g., agglomerative, divisive), probabilistic (e.g., Enhanced Model-based methods such as mixture of Gaussians), graph-theoretic (e.g., spectral clustering variants), and scale-space approaches.

In exemplary embodiments, to obtain a dense representation of the shapes of the clusters at block 110, two stages of clustering can be performed. In the first stage, an unsupervised, non-parametric clustering method such as, for example, perceptual clustering can be performed on the initial dataset, to determine the number of cluster shapes. In the second stage, the data points in each separate cluster shape are clustered a second time using a supervised, partitional clustering method such as, for example, k-means or k-mediod algorithms to partition each cluster shape into a desired number of smaller cluster regions to provide a dense representation of the clusters.

After clustering is performed in exemplary process 100, a smooth interpolation of the shapes of the clusters is obtained at block 120 by using a kernel density function that will be described in greater detail below. First, however, some terminology for the model used in the present exemplary embodiment will be outlined.

In the model of the present exemplary embodiment, given n sample points $\{X_1, X_2, \ldots X_n\}$ belonging to a cluster c, the contribution of each data point can be smoothed out over a local neighborhood of that data point. The contribution of data point $X_i$ to the estimate at some point X depends on how apart $X_i$ and X are. The extent of this contribution is dependent upon the shape of the kernel function adopted and the bandwidth, which determines the range of the local estimation neighborhood for each data point. In the present exemplary embodiment, denoting the kernel function as K and its bandwidth by h, the equation for determining the estimated density at any point x is provided by $$\hat{P}(X) = \frac{1}{n}\sum_{i=1}^{n} K\left(\frac{X - X_i}{h}\right),$$

where $\int K(t)dt=1$ to ensure that the estimate P(x) integrates to 1.

In exemplary embodiments, the kernel function K can be chosen to be a smooth unimodal function such as a Gaussian kernel. It should be noted that choosing the Gaussian as the kernel function is different from fitting the distribution to a mixture of Gaussian model. In the present situation, the Gaussian is only used as a function that weights the data points. In exemplary embodiments, a multivariate Gaussian could be used. In the present exemplary embodiment, a simpler approximation in terms of a product of one-dimensional kernels is used. Thus, the shape of a cluster c consisting of sample points $\{X_1, X_2, \ldots X_n\}$ at any arbitrary point X in the M-dimensional space is given by the approximation equation $$\hat{P}(X) = \frac{1}{\sqrt{2\pi}n}\sum_{i=1}^{n}\prod_{j}\frac{1}{h_j e}^{\frac{-(f_{ji}-\bar{f}_{ji})^2}{2h_j^2}},$$

where $(f_{1i}, f_{2i}, \ldots f_{Mi})$ are the values along the feature dimensions and $(\bar{f}_{1i}, \bar{f}_{2i}, \ldots \bar{f}_{Mi})$ are the sample means along the respective dimensions.

In exemplary embodiments, any suitable choice of bandwidth that is not too small or too large for performing kernel density estimation can be used. In the present exemplary embodiment, the bandwidth estimation formula that is used is one that is typically adopted for most practical applications and can be expressed by the following equation:

$$h_j = 1.06\min\left(\sqrt{\text{var}(f_j)}, \frac{iqr(f_j)}{1.34}\right)n^{\frac{-1}{5}},$$

where $f_j=(f_{j1}, f_{j2}, \ldots f_{jn})$ are features assembled from dimension j for all samples in the cluster. Here, $iqr(f_j)$ is the interquartile range of $f_j$ and n is the number of samples in the cluster. This bandwidth may generally produce a less smooth but more accurate density estimate.

At block 120 of exemplary process 100, the kernel density interpolation of the above approximation equation is applied by sampling the image size on a neighborhood of a specified image resolution for each selected clustering level. To interpolate the shape of clusters, the multidimensional image can be sampled with a fine grid having as much resolution as desired for the interpolation. For example, the image resolution could be specified as 256×256, 128×128, 64×64, etc. in exemplary embodiments. In the present exemplary embodiment, the sampling resolution is selected as 256×256 so that a dense representation of shape will be obtained. This can eliminate small, noisy samples that are in single connected components, as the bandwidth will reduce to zero when applying the kernel density approximation equation for such samples.

In exemplary embodiments in which a two-stage clustering is performed at block 110 to generate a number of cluster shapes and a desired number of smaller cluster regions for each cluster shape, the kernel density interpolation performed at block 120 can be applied to interpolate the shape of each smaller cluster region. A close fit estimation of the cluster shapes that resulted from the first clustering stage can then be obtained by uniting the interpolated shapes of the second-stage smaller cluster regions for each first-stage cluster shape. As a result, classification can be performed based upon more accurate approximations of regions of cluster shapes, rather simply based on proximity to a centroid or according to the boundary points of a pre-determined shape.

At block 130, after performing the kernel density interpolation, the kernel density estimate is evaluated from each cluster at each grid point using the above equation for determining the estimated density, and the maximum value of the estimate for each grid point is retained as an estimate along with the associated cluster label for the grid point. At block 140, for each grid point, if the maximum value of the density estimate for that grid point is above a chosen threshold, the grid point is classified as belonging to the associated cluster and therefore added to that cluster. At block 150, for each cluster, the new shape of the cluster is formed as the set of grid points added to that cluster at block 140, along with the sample points of the cluster that were previously isolated at block 110.

Figure 3A:
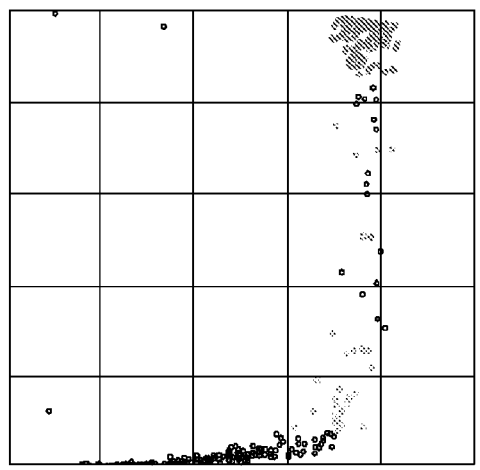
FIGS. 3a-3c are graphs illustrating stages of an exemplary embodiment of a shape interpolation process performed in accordance with the present invention.
Figure 3B:
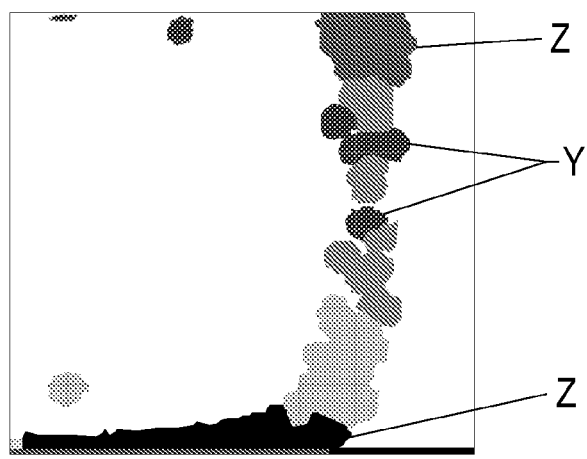
Figure 3C:
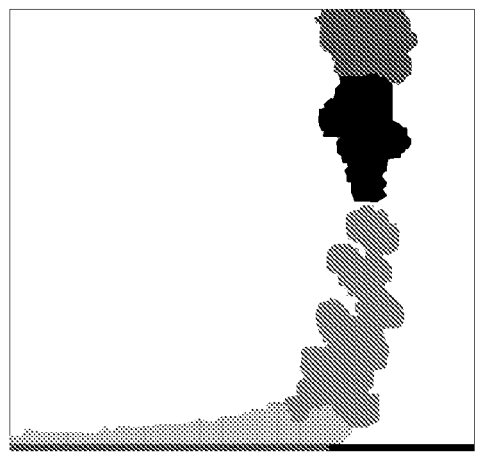

As a result of the exemplary shape interpolation process described above, a dense representation of clusters can be obtained. The resulting shape of each cluster will resemble the original cluster shape and therefore can be more indicative of a classification region around the cluster than the use of support vectors alone. FIGS. 3a-3c are graphs illustrating a shape interpolation performed in accordance with exemplary process 100 on an exemplary image of a set of data upon which clustering has been performed. FIG. 3a shows the original data. FIG. 3b illustrates the regions that were produced by interpolating the clusters of FIG. 3a using kernel density estimation. As can be seen, the interpolated shapes in FIG. 3b are representative of the overall cluster shapes in FIG. 3a and define "halo" regions around the clusters. The data points that fall within these regions would be classified as belonging to the respective clusters. The perceptible shapes of the clusters are preserved in the interpolation. As a result, the spatial adjacency of the regions indicated by arrow Y in FIG. 3b, as well as spatial disjointedness of the regions indicated by arrow Z, can both be easily spotted. In exemplary embodiments, the former pairs of regions and can be merged and the latter pairs of regions can be disconnected, and single sample clusters having no kernel density interpolation to form the region that were formed due to noise can be eliminated. FIG. 3c illustrates the final result of clustering after any needed noise removal and cluster merging is performed.

Although the exemplary embodiments described thus far have involved performing an explicit computation, in other exemplary embodiments, shape interpolation using kernel density estimation can be carried out dynamically during classification to find the nearest cluster. As a result, instead of using the centroid of the cluster as a prototypical member for computing the nearest distance, a new sample can be assigned to the cluster with the highest kernel density estimate.

The exemplary shape interpolation processes described above can be implemented to classify new data points by testing membership in a shape interpolated from a cluster of data points using kernel density estimation. Kernel density estimation as described herein utilizes a nonparametric function to provide a good dense interpolation of shape around a cluster. The details of the exemplary shape interpolation process illustrated in FIG. 2 can be summarized as follows:

1. Perform clustering of the data points using any clustering algorithm.

2. Let there be n sample points $\{X_1, X_2, \ldots X_n\}$ belonging to a cluster c.

3. Perform a dense shape interpolation using a kernel density function. That is, at a point X in the multidimensional space surrounding c, the contribution of data point $X_i$ to the estimate at some point X depends on how apart $X_i$ and X are. The extent of this contribution is dependent upon the shape of the kernel function adopted and the bandwidth in exemplary embodiments. Denoting the kernel function as K and its bandwidth by h, the estimated density at any point x is $$\hat{P}(X) = \frac{1}{n}\sum_{i=1}^{n} K\left(\frac{X - X_i}{h}\right),$$

where $\int K(t)dt=1$ to ensure that the estimate P(x) integrates to 1. In exemplary embodiments, the kernel function K is can be chosen to be a smooth unimodal function.

4. Given any new point X, the class that X belongs is the one for which the value of the approximation equation $$\hat{P}(X) = \frac{1}{n}\sum_{i=1}^{n} K\left(\frac{X - X_i}{h}\right)$$

is the maximum.

By approximating the shape of clusters at a chosen level through a dense kernel density function-based interpolation of sparse datasets, noise and region merging inconsistencies can also be removed in exemplary embodiments.

As a result of exemplary embodiments of the present invention, technically we have achieved a solution that can be implemented to interpolate cluster shapes by utilizing kernel density estimation to create a smoother approximation in a manner that is able to preserve the overall perception of the shapes given by the data points in a multidimensional feature space. Exemplary embodiments can be implemented to perform precise classification by more accurately identifying outlier data points.

The capabilities of exemplary embodiments of present invention described above can be implemented in software, firmware, hardware, or some combination thereof, and may be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Figure 4:
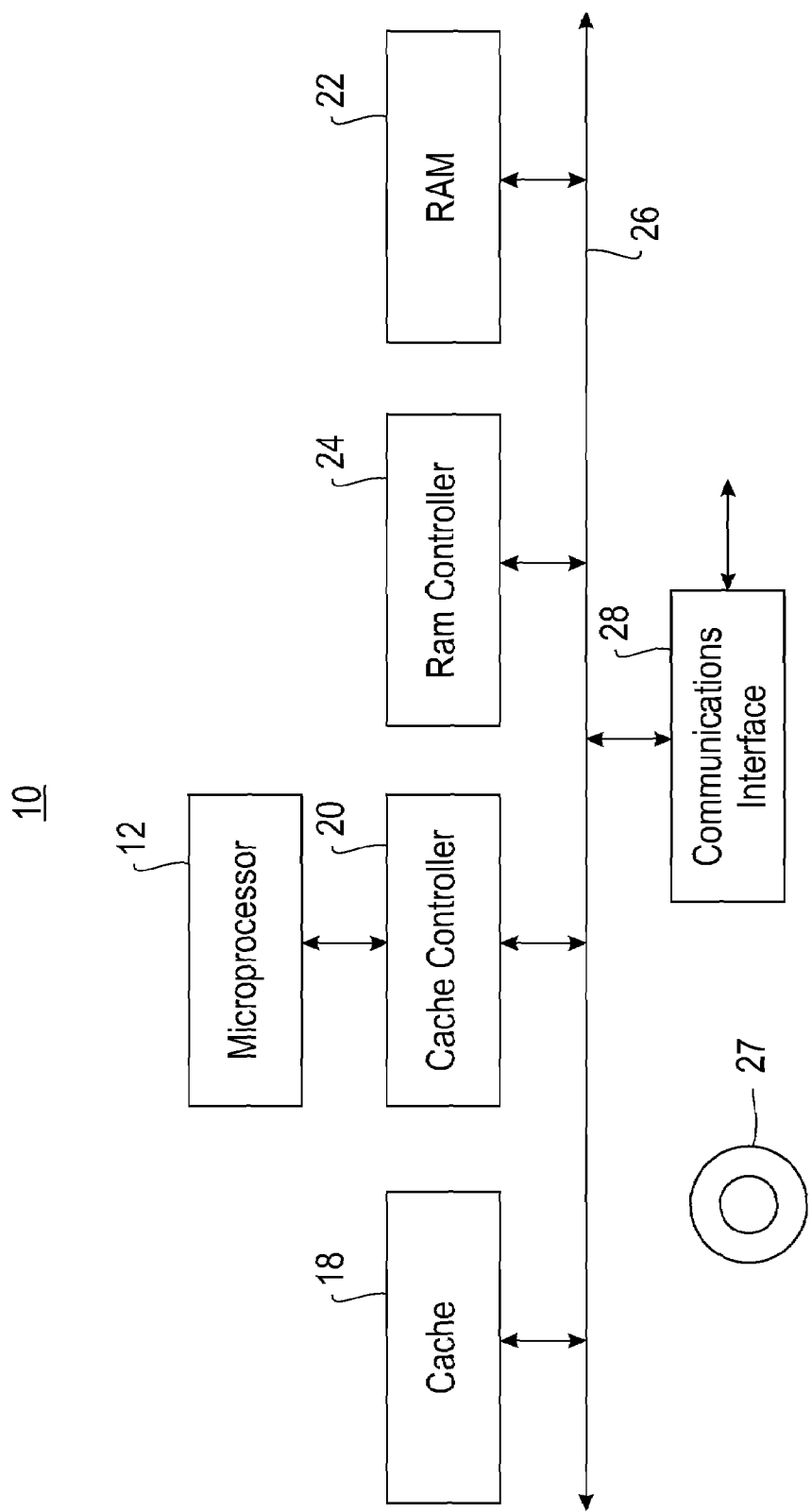
FIG. 4 is a block diagram illustrating an exemplary hardware configuration or a computer system within which exemplary embodiments of the present invention can be implemented.

For instance, exemplary embodiments of the present invention can be implemented within the exemplary embodiment of a hardware configuration provided for a computer system in FIG. 4. FIG. 4 illustrates an exemplary computer system 10 upon which exemplary embodiments of the present invention can be implemented. A processor or CPU 12 receives data and instructions for operating upon from on-board cache memory or further cache memory 18, possibly through the mediation of a cache controller 20, which can in turn receives such data from system read/write memory ("RAM") 22 through a RAM controller 24, or from various peripheral devices through a system bus 26. The data and instruction contents of RAM 22 will ordinarily have been loaded from peripheral devices such as a system disk 27. Alternative sources include communications interface 28, which can receive instructions and data from other computer systems.

The above-described program or modules implementing exemplary embodiments of the present invention can work on processor 12 and the like to perform shape interpolation. The program or modules implementing exemplary embodiments may be stored in an external storage medium. In addition to system disk 27, an optical recording medium such as a DVD and a PD, a magneto-optical recording medium such as a MD, a tape medium, a semiconductor memory such as an IC card, and the like may be used as the storage medium. Moreover, the program may be provided to computer system 10 through the network by using, as the recording medium, a storage device such as a hard disk or a RAM, which is provided in a server system connected to a dedicated communication network or the Internet.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method executed on a computer for representing a dataset for data classification, the method comprising:
   clustering the dataset using an unsupervised, non-parametric clustering method to generate a set of clusters each comprising a set of data points in an image of the dataset;
   clustering the data points of each cluster of the set of clusters using a supervised, partitional clustering method to partition each cluster into a specified number of sub-clusters each comprising a subset of the set of data points of the cluster;
   generating a density estimate value of each grid point of a set of grid points sampled from the image at a specified resolution for each sub-cluster in the image using a kernel density function;
   evaluating the density estimate value of each grid point for each sub-cluster to identify a maximum density estimate value for the grid point and a sub-cluster associated with the maximum density estimate value for the grid point;
   adding each grid point for which the maximum density estimate value exceeds a specified threshold to the sub-cluster associated with the maximum density estimate value for the grid point; and
   for each cluster of the set of the clusters, merging the sub-clusters of the cluster into a cluster region in the image corresponding to the cluster to form a shape interpolated representation of the set of clusters.

2. The method of claim 1, wherein the unsupervised, non-parametric clustering method is a perceptual clustering method, and wherein the supervised, partitional clustering method is selected from k-means clustering methods and k-mediod clustering methods.

3. The method of claim 1, wherein the kernel density function is a Gaussian kernel.

4. The method of claim 1, further comprising merging any spatially adjacent cluster regions in the shape interpolated representation and removing any spatially disjointed cluster regions in the shape interpolated representation.

5. The method of claim 1, further comprising classifying a new data point in the shape interpolated representation by generating a density estimate value of the new data point for each cluster region in the image using the kernel density function, evaluating the density estimate value of the new data point for each cluster region to identify a maximum density estimate value for the new data point and a cluster region associated with the maximum density estimate value for the new data point, and adding the new data point to the cluster region associated with the maximum density estimate value for the new data point in the shape interpolated representation if the maximum density estimate value for the new data point exceeds a specified threshold.

* * * * *